United States Patent
Hornbostel et al.

(10) Patent No.: US 9,920,964 B2
(45) Date of Patent: Mar. 20, 2018

(54) HYBRID INDIRECT/DIRECT CONTACTOR FOR THERMAL MANAGEMENT OF COUNTER-CURRENT PROCESSES

(71) Applicant: SRI INTERNATIONAL, Menlo Park, CA (US)

(72) Inventors: Marc D Hornbostel, Menlo Park, CA (US); Gopala N. Krishnan, Sunnyvale, CA (US); Angel Sanjurjo, San Jose, CA (US)

(73) Assignee: SRI International, Menlo Park, CA (US)

( * ) Notice: Subject to any disclaimer, the term of this patent is extended or adjusted under 35 U.S.C. 154(b) by 156 days.

(21) Appl. No.: 14/809,206

(22) Filed: Jul. 25, 2015

(65) Prior Publication Data
US 2015/0330676 A1    Nov. 19, 2015

Related U.S. Application Data

(63) Continuation of application No. PCT/US2014/017000, filed on Feb. 18, 2014.
(Continued)

(51) Int. Cl.
*F25B 15/00* (2006.01)
*F28C 3/14* (2006.01)
(Continued)

(52) U.S. Cl.
CPC ............... *F25B 15/00* (2013.01); *B01D 53/08* (2013.01); *B01D 53/261* (2013.01);
(Continued)

(58) Field of Classification Search
CPC ............... B01D 53/343; B01D 53/08; B01D 2259/4009; B01D 2259/65; B01J 8/12;
(Continued)

(56) References Cited

U.S. PATENT DOCUMENTS

| 2,458,435 A | 1/1949 | Simpson |
| 2,992,895 A | 7/1961 | Feustel et al. |

(Continued)

FOREIGN PATENT DOCUMENTS

| EP | 2077148 A2 | 7/2009 |
| WO | WO-2005/072256 A2 | 8/2005 |
| WO | WO-2013/094206 A1 | 6/2013 |

OTHER PUBLICATIONS

Supplementary European Search Report and Written Opinion dated Feb. 16, 2016 by the European Patent Office for Patent Application No. 14753656.9, which was filed on Feb. 18, 2014 and published as EP 2959252 on Dec. 30, 2015 (Inventor—Hornbostel et al.; Applicant-Stanford Research Institute International); (4 pages).

(Continued)

*Primary Examiner* — Emmanuel Duke
(74) *Attorney, Agent, or Firm* — Ballard Spahr LLP

(57) ABSTRACT

The invention relates to contactors suitable for use, for example, in manufacturing and chemical refinement processes. In an aspect is a hybrid indirect/direct contactor for thermal management of counter-current processes, the contactor comprising a vertical reactor column, an array of interconnected heat transfer tubes within the reactor column, and a plurality of stream path diverters, wherein the tubes and diverters are configured to block all straight-line paths from the top to bottom ends of the reactor column.

20 Claims, 4 Drawing Sheets

Related U.S. Application Data

(60) Provisional application No. 61/766,601, filed on Feb. 19, 2013.

(51) Int. Cl.

| | | |
|---|---|---|
| *B01J 8/12* | (2006.01) | |
| *B01D 53/08* | (2006.01) | |
| *B01D 53/26* | (2006.01) | |
| *B01D 53/34* | (2006.01) | |
| *F28D 13/00* | (2006.01) | |

(52) U.S. Cl.
CPC .............. *B01D 53/343* (2013.01); *B01J 8/12* (2013.01); *F28C 3/14* (2013.01); *B01D 2257/80* (2013.01); *B01D 2259/4009* (2013.01); *B01D 2259/65* (2013.01); *B01J 2208/0084* (2013.01); *B01J 2208/00132* (2013.01); *B01J 2219/1921* (2013.01); *B01J 2219/1923* (2013.01); *B01J 2219/1925* (2013.01); *B01J 2219/1928* (2013.01); *F28D 13/00* (2013.01)

(58) Field of Classification Search
CPC ...... B01J 2219/1928; B01J 2208/00132; B01J 2208/0084; B01J 2219/1921; B01J 2219/1923; B01J 2219/1925; F28C 3/14; F28D 13/00
USPC ................................................ 165/135, 172
See application file for complete search history.

(56) References Cited

U.S. PATENT DOCUMENTS

| | | | | |
|---|---|---|---|---|
| 3,791,102 A | | 2/1974 | Huntington | |
| 3,795,486 A | * | 3/1974 | Ekman | B01D 47/06 261/111 |
| 3,900,390 A | * | 8/1975 | Adams | B01J 8/12 208/210 |
| 4,034,717 A | * | 7/1977 | Clum | F22B 9/08 122/359 |
| 4,237,008 A | | 12/1980 | Ratigan et al. | |
| 4,578,850 A | * | 4/1986 | Kerr | B23P 15/26 165/158 |
| 4,588,024 A | * | 5/1986 | Murray | F28F 9/22 165/109.1 |
| 5,869,011 A | | 2/1999 | Lee | |

OTHER PUBLICATIONS

Communication Pursuant to Article 94(3) EPC dated Dec. 13, 2016 by the European Patent Office for Patent Application No. 14753656.9, which was filed on Feb. 18, 2014 and published as EP 2959252 on Dec. 30, 2015 (Inventor—Hornbostel et al.; Applicant—Stanford Research Institute International); (5 pages).

International Search Report and Written Opinion dated May 20, 2014 by the International Searching Authority for Patent Application No. PCT/US2014/017000, which was filed on Feb. 18, 2014 and published as WO 2014/130486 on Aug. 28, 2014 (Inventor—Hornbostel et al.; Applicant—Stanford Research Institute International); (8 pages).

International Preliminary Report on Patentability dated Aug. 25, 2015 by the International Searching Authority for Patent Application No. PCT/US2014/017000, which was filed on Feb. 18, 2014 and published as WO 2014/130486 on Aug. 28, 2014 (Inventor—Hornbostel et al.; Applicant—Stanford Research Institute International); (8 pages).

\* cited by examiner

HYBRID INDIRECT/DIRECT CONTACTOR FOR THERMAL MANAGEMENT OF COUNTER-CURRENT PROCESSES

CROSS-REFERENCE TO RELATED APPLICATIONS

This application is a continuation of PCT/US14/17000, filed Feb. 18, 2014 and claims priority to U.S. Ser. No. 61/766,601, filed Feb. 19, 2013, the disclosures of which are incorporated herein in its entirety.

This invention was made with government support under Contract No. DENT0005578 with the Department of Energy (NETL). The government has certain rights in the invention.

BACKGROUND

A counter-flow contactor provides efficient contact between opposing streams of material and is used to promote interaction between the two material streams. In many processes, the interaction can generate heat, causing the temperature of the materials to rise. For example, if the materials streams react chemically, then the heat of reaction can raise the temperature of the materials, sometimes causing the reaction to speed up and sometimes causing the reaction to slow down. In other process, the interaction can cause the adsorption of heat, causing the material stream temperature to decrease. For example, powdered materials can be dried by removing adsorbed water by contacting the powdered solid with hot, dry air. However, the evaporation of adsorbed water will cause the air temperature to decrease, limiting the effectiveness of the air in drying the solid. In these cases, there is a need to be able to continuously add or remove heat while these two counter flowing streams are interacting.

Relevant art: U.S. Pat. No. 4,588,024; U.S. Pat. No. 4,237,008; WO 2013094206.

SUMMARY

In an aspect, the technical field of the invention is contactors suitable for use, for example, in manufacturing and chemical refinement processes.

In an aspect is a hybrid indirect/direct contactor for thermal management of counter-current processes, the contactor comprising: a vertical reactor column comprising top and bottom ends and comprising a wall defining a stream path between the top to bottom ends of the reactor column; an array of interconnected heat transfer tubes within the reactor column, each of the tubes crossing the stream path, and the array forming a continuous heat transfer fluid flow path sealed by the tubes from the stream path; a plurality of stream path diverters attached to the wall; wherein the tubes and diverters are configured to block all straight-line paths from the top to bottom ends of the reactor column.

In embodiments:

the tubes are arranged in vertically spaced-apart rows, and wherein each row is offset from an adjacent row;

the contactor comprises a plurality of arrays of interconnected heat transfer tubes within the reactor column, each array crossing the stream path and forming a continuous heat transfer fluid flow path;

the contactor further comprises: a solid material contained and uniformly distributed within the contactor and cascading down around the tubes; a gas material contained and uniformly distributed within the contactor and flowing up around the tubes; and a heat transfer fluid contained within and flowing through the tubes;

the heat transfer tubes are interconnected in parallel, each of the heat transfer tubes being connecting to a common inlet manifold and a common outlet manifold;

the heat transfer tubes are interconnected in series, wherein one of the heat transfer tubes in the array is connected to an inlet port and one of the heat transfer tubes in the array is connected to an outlet port;

the tubes are arranged in vertically spaced-apart rows, and wherein each row is offset from an adjacent row, and wherein the heat transfer tubes are interconnected in parallel, each of the heat transfer tubes being connecting to a common inlet manifold and a common outlet manifold;

the tubes are arranged in vertically spaced-apart rows, and wherein each row is offset from an adjacent row, and wherein the heat transfer tubes are interconnected in series, wherein one of the heat transfer tubes in the array is connected to an inlet port and one of the heat transfer tubes in the array is connected to an outlet port;

the tubes are arranged in vertically spaced-apart rows, and wherein each row is offset from an adjacent row, and wherein the contactor comprises a plurality of arrays of interconnected heat transfer tubes within the reactor column, each array crossing the stream path and forming a continuous heat transfer fluid flow path;

the contactor comprises a plurality of arrays of interconnected heat transfer tubes within the reactor column, each array crossing the stream path and forming a continuous heat transfer fluid flow path; and wherein the contactor comprises: a solid material contained and uniformly distributed within the contactor and cascading down around the tubes; a gas material contained and uniformly distributed within the contactor and flowing up around the tubes; and a heat transfer fluid contained within and flowing through the tubes;

the contactor comprises a plurality of arrays of interconnected heat transfer tubes within the reactor column, each array crossing the stream path and forming a continuous heat transfer fluid flow path, and wherein in at least one array of the plurality of arrays the heat transfer tubes are interconnected in parallel, each of the heat transfer tubes being connecting to a common inlet manifold and a common outlet manifold; and the contactor comprises a plurality of arrays of interconnected heat transfer tubes within the reactor column, each array crossing the stream path and forming a continuous heat transfer fluid flow path, and wherein in at least one array of the plurality of arrays the heat transfer tubes are interconnected in series, wherein one of the heat transfer tubes in the array is connected to an inlet port and one of the heat transfer tubes in the array is connected to an outlet port.

In an aspect is a method of using the contactor as above, the method comprising steps: supplying a solid material contained and uniformly distributed within the contactor and cascading down around the tubes; supplying a gas material contained and uniformly distributed within the contactor and flowing up around the tubes; and supplying a heat transfer fluid contained within and flowing through the tubes.

In an aspect is first and second contactors, each as above, arranged vertically to define a combined stream path from the top end of the top contactor to the bottom end of the bottom contactor, wherein a hot heat transfer fluid is contained within and flowing through the tubes of the top contactor, and a cold heat transfer fluid is contained within and flowing through the tubes of the bottom contactor.

In an aspect is a method of using the first and second contactors as above, the method comprising steps: supplying a solid material contained and uniformly distributed within the contactor and cascading down around the tubes; supplying a gas material contained and uniformly distributed within the contactor and flowing up around the tubes; and supplying a heat transfer fluid contained within and flowing through the tubes.

These and other aspects will be apparent from the disclosure provided herein.

DETAILED DESCRIPTION OF VARIOUS EMBODIMENTS

Figure 1:
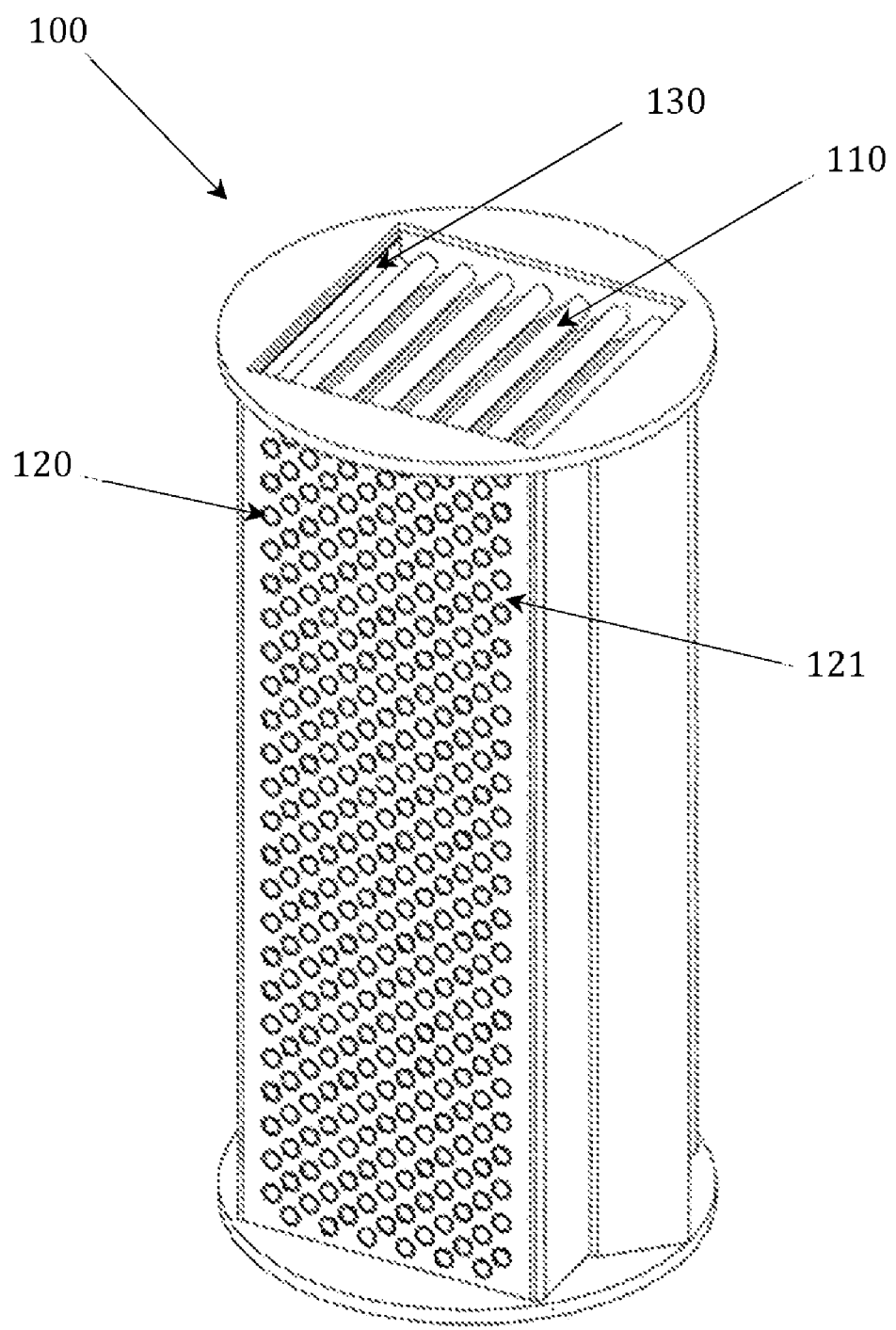
FIG. 1 provides a drawing of a contactor according to an embodiment described herein.

Herein is described a contactor in which an array of tubes cross the path of the material streams. In an embodiment the tubes are arranged to allow a solid material to cascade down from layer to layer of the tubes, causing the solid flow to become uniformly distributed within the contactor and to make repeated contact with the surface of the tubes. An upward counter flow of gas is also caused to become distributed within the contactor and to come into contact with both the falling solid material and the surface of the tubes.

In an aspect is a hybrid indirect/direct contactor for thermal management of counter-current processes, the contactor comprising: a vertical reactor column comprising top and bottom ends and comprising a wall defining a stream path between the top to bottom ends of the reactor column; an array of interconnected heat transfer tubes within the reactor column, each of the tubes crossing the stream path, and the array forming a continuous heat transfer fluid flow path sealed by the tubes from the stream path; a plurality of stream path diverters attached to the wall; wherein the tubes and diverters are configured to block all straight-line paths from the top to bottom ends of the reactor column.

The contactor comprises a vertical reactor column. The reactor column is configured to accept at least two materials in a counter-current flow arrangement, and to facilitate contact between the two materials. The reactor column is further configured to provide a continuous flow of a heat transfer fluid (or other fluid) through tubes disposed within the column, and to maximize indirect contact between the heat transfer fluid and the counter-flowing materials.

The vertical reactor column comprises a top end and a bottom end, and a wall there-between. The wall defines a stream path between the top and bottom ends of the reactor column. In embodiments, the wall is a curved wall forming a cylinder, and the stream path is a cylindrical column. In embodiments, the wall comprises flat surfaces joined by straight edges and forms, for example, a square cylinder (i.e., a cylinder with a square cross section) or another prism shape. The wall may comprise 3, 4, 5, 6, 7, 8, or more than 8 flat surfaces joined to form the prism.

The vertical reactor column may have any suitable dimensions, with such dimensions being determined in part by the intended use, volume of materials to transit the column, operating pressure and temperature, material from which the column is made, and the like. The inner diameter of the reactor column is a factor that in part defines the size of the stream path, which is described in more detail herein.

The vertical reactor column can be made of any suitable material, such as stainless steel, aluminium, iron, etc. A suitable material is generally one that is non-reactive with the intended counter-flowing materials, any reaction products, etc.

The vertical reactor column (i.e., the wall thereof) defines a stream path extending continuously between the top and bottom ends of the reactor column. The stream path is a space suitable for the flow of the counter-flowing materials described herein, and comprises a plurality of individual pathways that material can take through the reactor column (from top to bottom, or bottom to top, depending on the direction of flow of material). As described herein, such individual pathways are not straight-line pathways due to the presence of tubes and/or diverters within the stream path in the reactor column.

The vertical reactor column may be further configured to allow a plurality of columns to be connected in series. For example, the columns may comprise complementary lips, flanges, ledges, clamps, or the like, enabling such connection. In embodiments the connection is fluid-tight (i.e., gas tight and liquid tight), and may comprising a sealing element such as an O-ring or collar. When two or more reactor columns are connected, the stream path extends from the top of a first reactor column to the bottom of the second (or third, or fourth, etc.) reactor column.

The vertical reactor column has top and bottom ends, although in embodiments the column is symmetrical (i.e., about a horizontal plane dissecting the middle of the column length) such that the top and bottom ends are identical. In other embodiments the column is asymmetrical such that the top end is distinguishable from the bottom end. For example, the top end may have a different diameter compared with the bottom end. For example, the top end may have a larger diameter such that the stream path gets smaller in diameter from top to bottom ends of the column. The opposite situation is also possible—i.e., the stream path (and therefore the column diameter) can get larger in diameter from to bottom ends of the column.

In embodiments, the wall of the reactor column is temperature controlled. For example, the exterior surface of the wall may be bathed in heat transfer fluid, or the wall may be surrounded by pipes that wrap around the column and contain heat transfer fluid. Such pipes may also extend into and regulate the temperature of the diverters, which are explained in more detail herein.

The dimensions of the vertical reactor column will be determined (in part) by the intended application, but may range from laboratory scale (e.g., diameter between 0.05-0.5 m and length between 0.3-3 m) to industrial/commodity scale (e.g., diameter greater than or equal to 1, 2, 3, or 5 m, and length greater than or equal to 3, 5, 7, or 10 m).

The contactor comprises an array of interconnected heat transfer tubes. The heat transfer tubes are disposed within the reactor column, such that the counter-flowing materials contact the surfaces of the heat transfer tubes as they flow along the stream path.

In embodiments, each tube in the array of tubes traverses the reactor column perpendicularly to the stream path. That is, for a vertical reactor column, the tubes are arranged horizontally and cross through the interior of the reactor column. Accordingly, each tube of the array of tubes crosses through the stream path. Therefore, the array of tubes function as a plurality of barriers to material flowing through the stream path, and the counter-flowing materials must navigate around the array of tubes in order to flow from the top to bottom (or bottom to top) ends of the vertical reactor column. This arrangement provides maximal contact surface area between the array of tubes and the counter-flowing materials.

The array of tubes is configured to allow a heat transfer fluid to flow there-through, and forms a continuous heat transfer fluid flow path. In embodiments, the array of tubes is in communication with other components contributing to such fluid flow, such as a fluid reservoir(s), fluid pump(s), heat exchangers, filtration or purification systems, manifolds, connecting tubes, and the like.

Two arrangements of interconnection of the array of tubes are possible: parallel interconnection and series interconnection. The two arrangements may be used exclusively (i.e., all tubes within the contactor are in parallel or all tubes are in series), or may be used in combination (e.g., two separate arrays of tubes, each arranged in parallel, are collectively connected in series) as desired.

In the parallel interconnection arrangement, each of the heat transfer tubes in the array of tubes is connecting to a common inlet manifold and a common outlet manifold. Heat transfer fluid is supplied to the common inlet manifold from a reservoir, and at the inlet manifold the fluid branches into any of a plurality of tubes. Fluid flows through the plurality of tubes in parallel, and exits the tubes into a common outlet manifold. The fluid from the plurality of tubes recombines in the outlet manifold and is then transferred either to another array of tubes or returned to the reservoir (possibly via connector tubes, heat exchangers, chillers, filters, or the like). In the parallel arrangement, heat transfer fluid flows through all tubes in the array of tubes in the same direction—i.e., from one common side of the reactor column to the other common side of the reactor column.

In the series interconnection arrangement, one of the heat transfer tubes in the array is connected to an inlet port and one of the heat transfer tubes in the array is connected to an outlet port. Heat transfer fluid is supplied to the inlet port from a reservoir, and heat transfer fluid exits the array of tubes via the outlet port, either to be returned to another array of tubes, or to be returned to the reservoir (again, possibly via connector tubes, heat exchangers, chillers, filters, or the like). Between the inlet and outlet ports, the heat transfer fluid flows through one tube, exits the tube, traverse an external connecting tube (i.e., external to the reactor column), enters a second tube, and flows through the second tube. The external connecting tube may be insulated or otherwise temperature controlled. This series connection may involve any number of tubes provided that the desired temperature characteristics of the heat transfer fluid are maintained. Furthermore, the series connection may involve tubes within a single row (i.e., tubes within a horizontal row are connected in series), or, the series connection may involve tubes across multiple rows (i.e., a tube from one row connects to a tube in an adjacent row). In an embodiment, each series connection involves a single tube from each row in the reactor column, and therefore the series connection extends from top to bottom ends of the reactor column. In the series arrangement, heat transfer fluid flows through some tubes in the array of tubes in one direction (i.e., from one side to the other side of the reactor column, in a direction that is horizontal and therefore perpendicular to the stream path), and through other tubes in the array of tubes in the opposite direction.

The contactor may comprise a plurality of arrays of interconnected heat transfer tubes within the reactor column, each array crossing the stream path and forming a continuous heat transfer fluid flow path. Each array can be independently selected from a series arrangement and a parallel arrangement. The tubes can be grouped such that tubes within a given section of the contactor are common to a single array (e.g., the upper or lower half of the tubes, or a block of tubes, etc.), or the tubes can be grouped in patterns (e.g., every alternating row of tubes is common to a single array).

The continuous heat transfer fluid flow path is sealed by the tubes from the stream path. Accordingly, the tubes are sealed tubes, meaning that they comprise solid walls, and are therefore not porous or foraminous. Thus, the heat transfer fluid does not come into direct contact with the counter-flowing materials, but only makes indirect contact via the walls of the tubes.

The array of heat transfer tubes may comprise any suitable number of tubes, with the number generally being determined by a variety of factors such as: diameter(s) of the tubes; length (height) of the reactor column; and space between tubes. For example, the array may comprise between 4-1,000 tubes, or 4-500 tubes. For a reactor column of sufficient length, or tubes of sufficiently small diameter, more than 1000 tubes may be present.

In embodiments, the tubes are arranged in vertically spaced apart rows (where each row comprises horizontally spaced apart tubes). In embodiments, the tubes are arranged so that each row of tubes is located underneath the spaces between tubes in the row above, such that each row is offset from an adjacent row. That is, the tubes are arranged in rows and the rows are staggered. The row may be staggered such that every other row is aligned (i.e., along the stream path, the tubes of one row are offset from the tubes of an adjacent row, but align with the tubes two rows up or down the stream path). Alternatively, the layers may be staggered in a stair-step fashion such that any two rows separated by 2, 3, 4, 5, 6, 7, 8, 9, 10, or more than 10 rows are aligned. In other words, for any given row in the array of tubes, every second, third, fourth, fifth, sixth, seventh, eighth, ninth, tenth, etc. row has an identical footprint within the stream path. In an embodiment, adjacent rows are offset by 5-100, or 25-100, or 50-100%, or by 10, 20, 30, 40, 50, 60, 70, 80, 90, or 100% of the diameter of a tube.

Each row of tubes may comprise between 2-100, or 2-50, or 2-10, or more than 2, 5, 8, 10, 15, or 20 tubes, as desired. For reactor columns of sufficient width, or for tubes of sufficiently small diameter, more than 100 tubes may be in any given row of tubes.

The contactor comprises a plurality of stream path diverters attached to the wall of (and disposed within) the reactor column. The diverters are bulges, or ridges, or baffles, or the equivalent, and extend from the wall in order to prevent flow of any counter-flowing material along the wall (i.e., flow of material that might bypass the array of tubes). Depending on the positioning of the tubes and other geometrical factors, the distance to which the diverters extend from the wall may vary. For example, the diverters may extend between 0.5-20, or 1-10% of the inside diameter of the reactor column.

In embodiments, the diverters may be temperature controlled such as by flowing heat transfer fluid through or adjacent to the diverters (e.g., in pipes or the like transiting through or adjacent to the diverters). In embodiments, the diverters are not temperature controlled.

The size and number and positioning of the diverters, and the number and size and positioning of the tubes, are selected such that the tubes and diverters in combination are configured to block all straight-line paths from the top to the bottom ends (or, equivalently, from the bottom to the top ends) of the reactor column. That is, there are no straight-line paths vertically through the contactor. That is, the stream path does not contain any straight-line paths extending uninterrupted through the entire reaction column. Accordingly, the counter-flowing materials must follow a curved pathway that, in some cases, includes contact with one or more obstructions (heat transfer tubes or stream path diverters) and, in some cases, curves around such obstruction as it traverses the length of the reaction column. The lack of straight-line paths ensures that all material directly contacts or is diverted by (and therefore comes into close proximity to) obstructions and this causes more thorough mixing (compared with contactors containing straight-line paths) of the counter-flowing materials. Contactors containing tubes that fully align throughout the column height have less efficient mixing compared with the contactors described herein.

In embodiments, the tube positioning, size, etc. is selected to minimize the size and number of diverters. In embodiments, the tube diameters are selected to ensure efficient heat transfer from the heat transfer material to/from the counter-flowing materials.

Heat may be added or removed from the process by flowing a heat transfer fluid through the tubes that cross the contactor. The heat transfer fluid can be steam, cooling water, thermal oils, refrigerants, or other suitable fluids. The heat transfer fluid may be stored in a reservoir and may further be treated to remove or add heat (e.g., via a heat exchanger, a boiler, or the like).

As mentioned herein, the heat transfer fluid can be caused to flow through all tubes in parallel, resulting in a cross-flow arrangement between the heat transfer fluid and the material flows. The heat transfer fluid can also be caused to snake back and forth through sub sets of tubes, moving from bottom to top of the contactor or from top to bottom. In this way the heat transfer fluid will move counter-current to one material flow and co-current to the other material flow. Counter- or co-flow arrangements can be used to create a desired temperature profile within the contactor, allowing improved control of the process.

In an embodiment, first and second contactors are arranged vertically to define a combined stream path from the top end of the top contactor to the bottom end of the bottom contactor, wherein a hot heat transfer fluid is contained within and flowing through the tubes of the top contactor, and a cold heat transfer fluid is contained within and flowing through the tubes of the bottom contactor. If desired, more than two contactors can be connected in series.

The counter-flowing materials can be any suitable materials that are normally used in a counter-current contactor. The materials may be any fluid—liquids or gases—and in some cases may be a solid, and in some cases may be combinations thereof. For example, the material that traverses the reactor column from top to bottom (i.e., falls through the reactor column) may be solid particles such as an absorbent, a catalyst, or the like. Also for example, that material that traverses the reactor column from bottom to top (i.e., rises through the reactor column) may be a liquid or gas, particularly such as a gas. For example, the material that traverses the reactor column from top to bottom is a sorbent solid particulate material, used to dry the material traversing in the opposite direction (which may be a gas or liquid).

In an embodiment of use, solid sorbent particles fall down around the tubes, a counter-current flow of gas flows up around the tubes and a heat transfer fluid flows horizontally through the tubes. Solid particles falling down through the contactor are forced to impact on each horizontal row of tubes, maintaining good distribution in the contactor and providing good thermal contact between the solid particles and the heat transfer fluid. Likewise, the gas flow is caused to split and merge around each layer of tubes. The gas contacts the solid particles directly and exchanges heat with the particles and with the tubes, which also contributes to the transfer of heat. The motion of the solid particles through the gas as the particles impinge on the horizontal tubes prevents the establishment of a gas boundary layer that would limit the heat transfer from the gas to the tubes.

In an embodiment is provided a gravity-fed counter-current contactor as described herein. One of the counter-flowing materials is supplied to the top end of the contactor vertical reactor column, and traverses through the column (i.e., through the stream path) as dictated by gravity. The other of the counter-flowing materials is supplied to the bottom end of the contactor vertical reactor column, and is powered by one or more of pumps, blower motors, pressure differentials, and the like.

Referring now to FIG. 1, contactor 100 is shown and contains tubes 110 and diverters 130. Tubes 110 are arranged in rows, with row 120 and row 121 showing that adjacent rows are offset.

Figure 2:
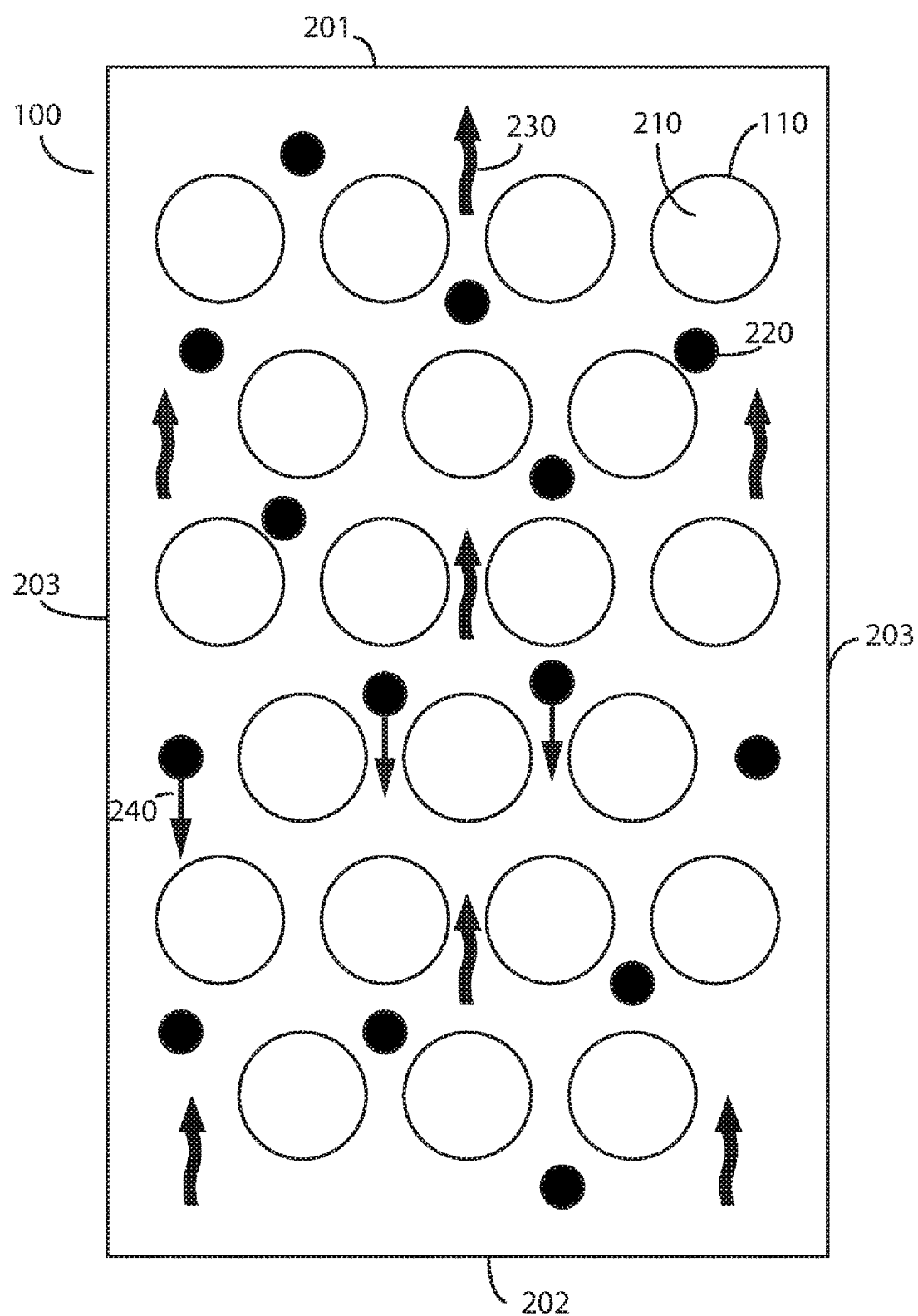
FIG. 2 provides a schematic, vertical cross-sectional view of a contactor according to an embodiment described herein.

Referring now to FIG. 2, the contactor 100 comprises a vertical reactor column comprising a top end 201 and a bottom end 202 and comprising a wall 203 defining a stream path between the top and bottom ends of the reactor column; an array of interconnected heat transfer tubes 110 within the reactor column, each of the tubes crossing the stream path, and the array forming a continuous heat transfer fluid flow path sealed by the tubes from the stream path; a gas 230 flowing up the stream path, around the tubes and exiting the top end of the reactor column; a solid sorbent 240 comprising adsorbed water and flowing down (direction shown arrows 240) the stream path, counter-current to the gas flow, cascading around the tubes, and exiting the bottom end of the reactor column; a heat transfer fluid 210 contained within and flowing through the tubes.

Figure 3:
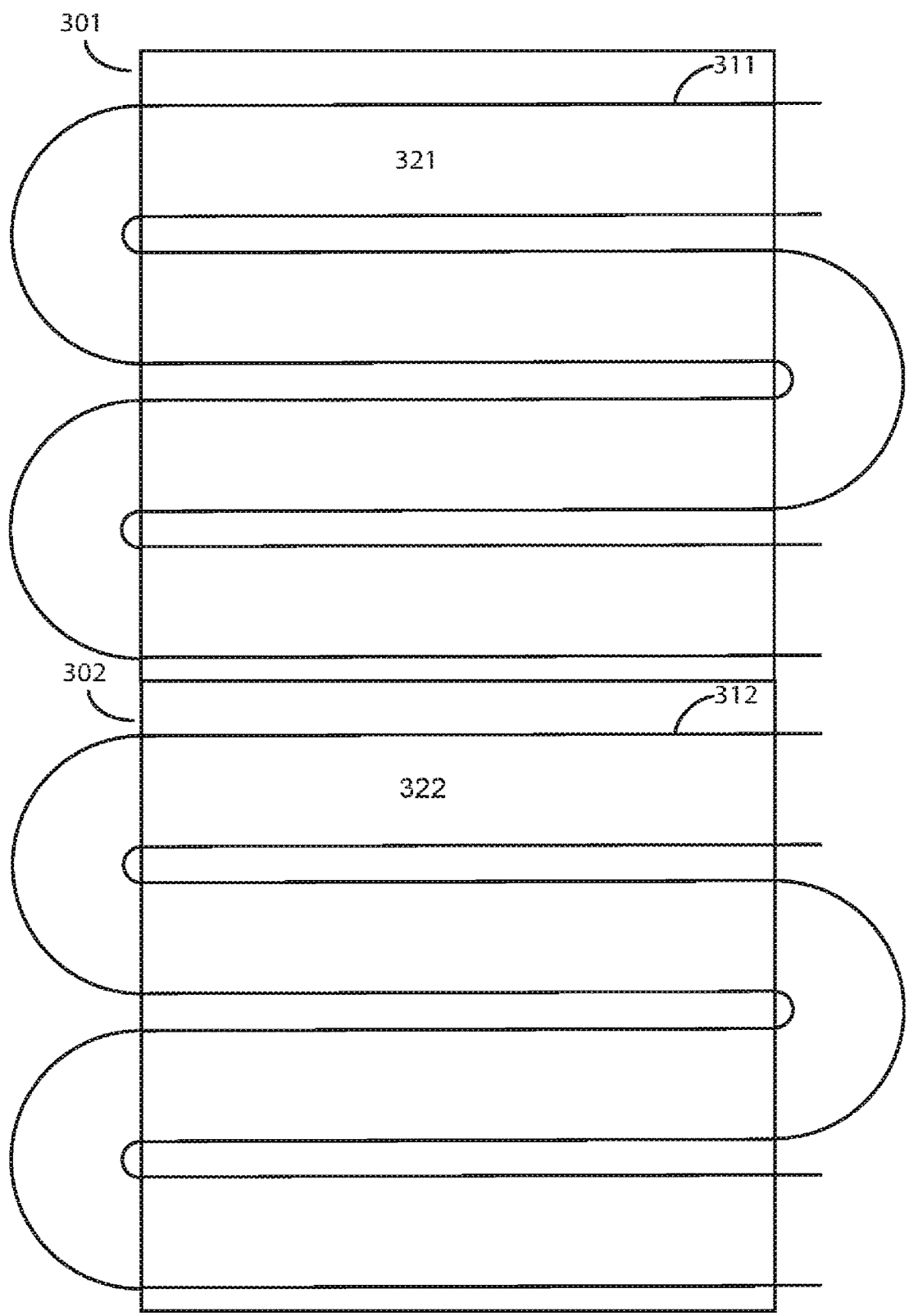
FIG. 3 provides a schematic, vertical cross-sectional view of a combined top and bottom contactor according to an embodiment described herein.

Referring now to FIG. 3, the column comprises a top contactor 301 comprising heat transfer tubes 311 containing a hot heat transfer fluid 321 and a bottom contactor 302 comprising heat transfer tubes 312 containing a cold heat transfer fluid 322.

Figure 4:
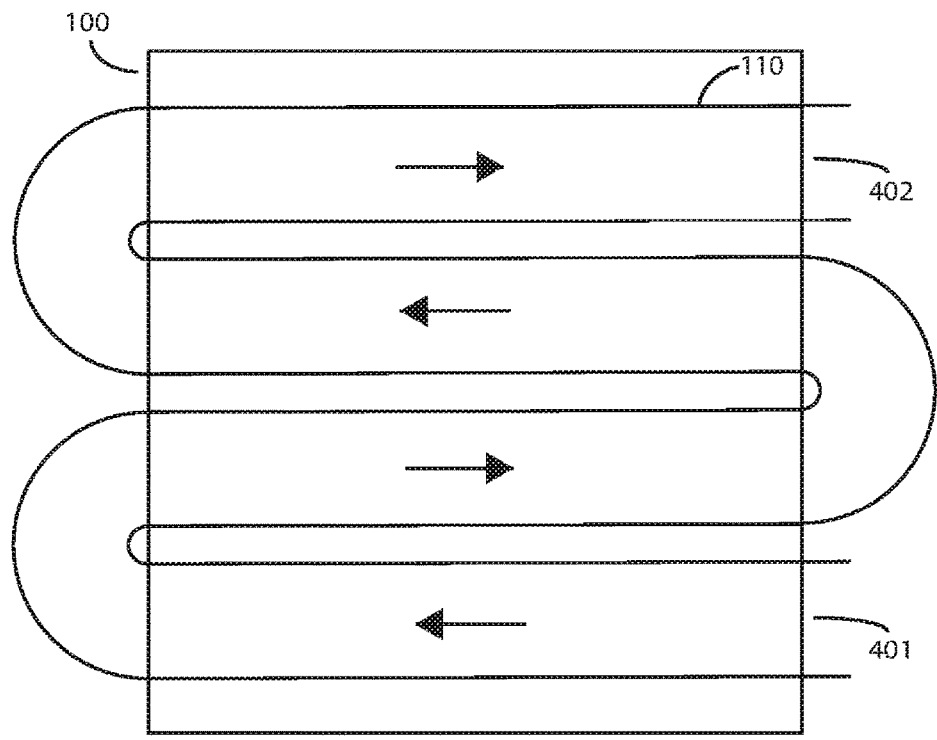
FIG. 4 provides a schematic, vertical cross-sectional view (90° rotated relative to FIG. 2) of a contactor according to an embodiment described herein.

Referring to FIG. 4, the contactor 100 comprises the heat transfer tubes 110, interconnected in series, wherein one of the heat transfer tubes in the array is connected to an inlet port 401 and one of the heat transfer tubes in the array is connected to an outlet port 402. The arrows show direction of fluid flow (see para 0039).

Figure 5:
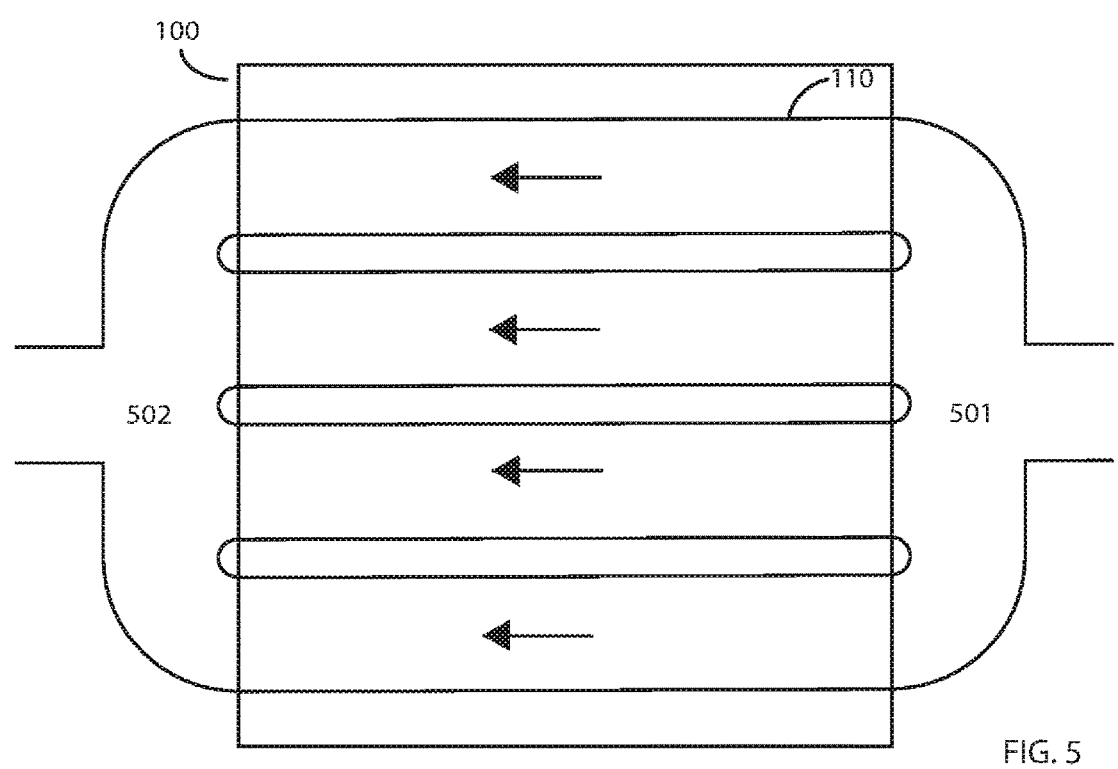
FIG. 5 provides a schematic, horizontal cross-sectional view of a contactor according to an embodiment described herein.

Referring to FIG. 5, the contactor 100 comprises heat transfer tubes 110, interconnected in parallel, each of the heat transfer tubes 110 being connecting to a common inlet manifold 501 and a common outlet manifold 502. The arrows show direction of fluid flow (see para 0038).

The invention encompasses all combinations of recited particular and preferred embodiments. It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein, including citations therein, are hereby incorporated by reference in their entirety for all purposes.

EXAMPLES

Solid sorbents can adsorb large amounts of water and it is sometimes necessary to remove the adsorbed water and then to cool the sorbent to provide cool, dry sorbent for reuse. In this example, two contactor units are arranged vertically. Dry air can be supplied such that it flows first through the bottom contactor and then through the top contactor. The sorbent is allowed to fall through the two contactors from top to bottom, counter-current to the airflow. The top contactor is provided with a hot heat transfer fluid. This fluid could be steam, hot oil, hot water etc. The bottom contactor is provided with a cold heat transfer fluid, chilled water for example. As the solid enters the top of the column, it is heated by contact with the hot air and the hot tubes, causing evaporation of the adsorbed water. Without the addition of more heat, the evaporation would cause the sorbent and the air to cool, stopping or dramatically reducing the rate of evaporation. However, heat is continually supplied from the heat transfer fluid through the horizontal tubes. This maintains the temperature of both the air and the sorbent, keeping the evaporation rate high. This allows a small flow of air to carry away a large volume of water vapor/steam. The steam content of the exiting air can be as high as 90% and therefore can be used to provide heat to another part of the system. As the sorbent exits the top contactor and enters the bottom contactor, the counter flow of cold air from the bottom contactor sweeps away remaining moisture, cooling the solid and heating the air. The cooling of the solid is completed in the bottom contactor through contact with the cold air and the cold heat transfer fluid inside the tubes.

In another example, the contactor unit is used in a falling microbead reactor. The contactor allows the hot, moisture laden sorbent to be dried and cooled efficiently while producing a hot gas stream containing primarily steam that can be recycled to provide heat for the process.

What is claimed is:

1. A hybrid indirect/direct contactor for thermal management of counter-current processes, the contactor comprising:
   a vertical reactor column comprising a top end and a bottom end and comprising a wall defining a stream path between the top and bottom ends of the reactor column;
   an array of interconnected heat transfer tubes within the reactor column, each of the tubes crossing the stream path, and the array forming a continuous heat transfer fluid flow path sealed by the tubes from the stream path;
   a gas flowing up the stream path, around the tubes and exiting the top end of the reactor column;
   a solid sorbent comprising adsorbed water and flowing down the stream path, counter-current to the gas flow, cascading around the tubes, and exiting the bottom end of the reactor column;
   a heat transfer fluid contained within and flowing through the tubes;
   the contactor configured so that as the solid sorbent enters the top of the column, it is heated by contact with both the gas and the tubes, causing evaporation of the water off the sorbent to produce steam, wherein the gas exiting the top end of the column comprises the steam, wherein the evaporation is maintained by continuous heat transfer from the tubes, maintaining the temperature of both the gas and the solid sorbent, and wherein the cascading solid sorbent impinges on the tubes, preventing establishment of a gas boundary that would otherwise restrict heat transfer between the gas and the tubes.

2. The contactor of claim 1, wherein the column comprises a top contactor comprising heat transfer tubes containing a hot heat transfer fluid and a bottom contactor comprising heat transfer tubes containing a cold heat transfer fluid, configured so that as the sorbent exits the top contactor and enters the bottom contactor, the counter flow of cold air from the bottom contactor sweeps away remaining moisture, cooling the solid sorbent by contact with both the cold gas and the heat transfer tubes containing the cold heat transfer fluid.

3. The contactor of claim 1, wherein a plurality of stream path diverters are attached to the wall.

4. The contactor of claim 1, wherein the solid sorbent is uniformly distributed within the contactor.

5. The contactor of claim 1, wherein the gas is uniformly distributed within the contactor.

6. The contactor of claim 1, wherein there are no straight-line flow paths from the top to bottom ends of the reactor column.

7. The contactor of to claim 1, wherein the heat transfer tubes are arranged in vertically spaced-apart rows, and wherein each row is offset from an adjacent row.

8. The contactor of 1, wherein the heat transfer tubes are interconnected in parallel, each of the heat transfer tubes being connecting to a common inlet manifold and a common outlet manifold.

9. The contactor of claim 1, wherein the heat transfer tubes are interconnected in series, wherein one of the heat transfer tubes in the array is connected to an inlet port and one of the heat transfer tubes in the array is connected to an outlet port.

10. The contactor of claim 1, wherein the contactor comprises a plurality of arrays of interconnected heat transfer tubes within the reactor column, each array crossing the stream path and forming a continuous heat transfer fluid flow path.

11. The contactor of claim 1, configured so that the steam is recycled to provide heat for the processes.

12. The contactor of claim 1, wherein a plurality of stream path diverters are attached to the wall, and
   the tubes and diverters are configured to block all straight-line paths from the top to bottom ends of the reactor column.

13. The contactor of claim 1, wherein the solid sorbent is uniformly distributed within the contactor,
   the gas is uniformly distributed within the contactor,
   a plurality of stream path diverters are attached to the wall,
   the tubes and diverters are configured to block all straight-line paths from the top to bottom ends of the reactor column, and
   the column comprises a top contactor comprising heat transfer tubes containing a hot heat transfer fluid and a bottom contactor comprising heat transfer tubes containing a cold heat transfer fluid, configured so that as the sorbent exits the top contactor and enters the bottom contactor, the counter flow of cold air from the bottom contactor sweeps away remaining moisture, cooling the solid sorbent by contact with both the cold gas and the heat transfer tubes containing the cold heat transfer fluid.

14. The contactor of claim 1, wherein the heat transfer tubes are arranged in vertically spaced-apart rows, and wherein each row is offset from an adjacent row, and the heat transfer tubes are interconnected in parallel, each of the heat transfer tubes being connecting to a common inlet manifold and a common outlet manifold.

15. A contactor according to claim 1, wherein the heat transfer tubes are arranged in vertically spaced-apart rows, and wherein each row is offset from an adjacent row, and
the heat transfer tubes are interconnected in series, wherein one of the heat transfer tubes in the array is connected to an inlet port and one of the heat transfer tubes in the array is connected to an outlet port.

16. The contactor of claim 1, wherein the heat transfer tubes are arranged in vertically spaced-apart rows, and wherein each row is offset from an adjacent row, and the contactor comprises a plurality of arrays of interconnected heat transfer tubes within the reactor column, each array crossing the stream path and forming a continuous heat transfer fluid flow path.

17. The contactor of claim 1, wherein the contactor comprises a plurality of arrays of interconnected heat transfer tubes within the reactor column, each array crossing the stream path and forming a continuous heat transfer fluid flow path, and in at least one array of the plurality of arrays the heat transfer tubes are interconnected in parallel, each of the heat transfer tubes being connecting to a common inlet manifold and a common outlet manifold.

18. The contactor of claim 1, wherein the contactor comprises a plurality of arrays of interconnected heat transfer tubes within the reactor column, each array crossing the stream path and forming a continuous heat transfer fluid flow path, and at least one array of the plurality of arrays the heat transfer tubes are interconnected in series, wherein one of the heat transfer tubes in the array is connected to an inlet port and one of the heat transfer tubes in the array is connected to an outlet port.

19. First and second contactors, each according to claim 1, arranged vertically to define a combined stream path from the top end of the top contactor to the bottom end of the bottom contactor, wherein a hot heat transfer fluid is contained within and flowing through the tubes of the top contactor, and a cold heat transfer fluid is contained within and flowing through the tubes of the bottom contactor.

20. A method of using the contactor of claim 1 comprising steps:
supplying a solid material contained and uniformly distributed within the contactor and cascading down around the tubes;
supplying a gas material contained and uniformly distributed within the contactor and flowing up around the tubes; and
supplying a heat transfer fluid contained within and flowing through the tubes.

* * * * *